UNITED STATES PATENT OFFICE 2,068,868

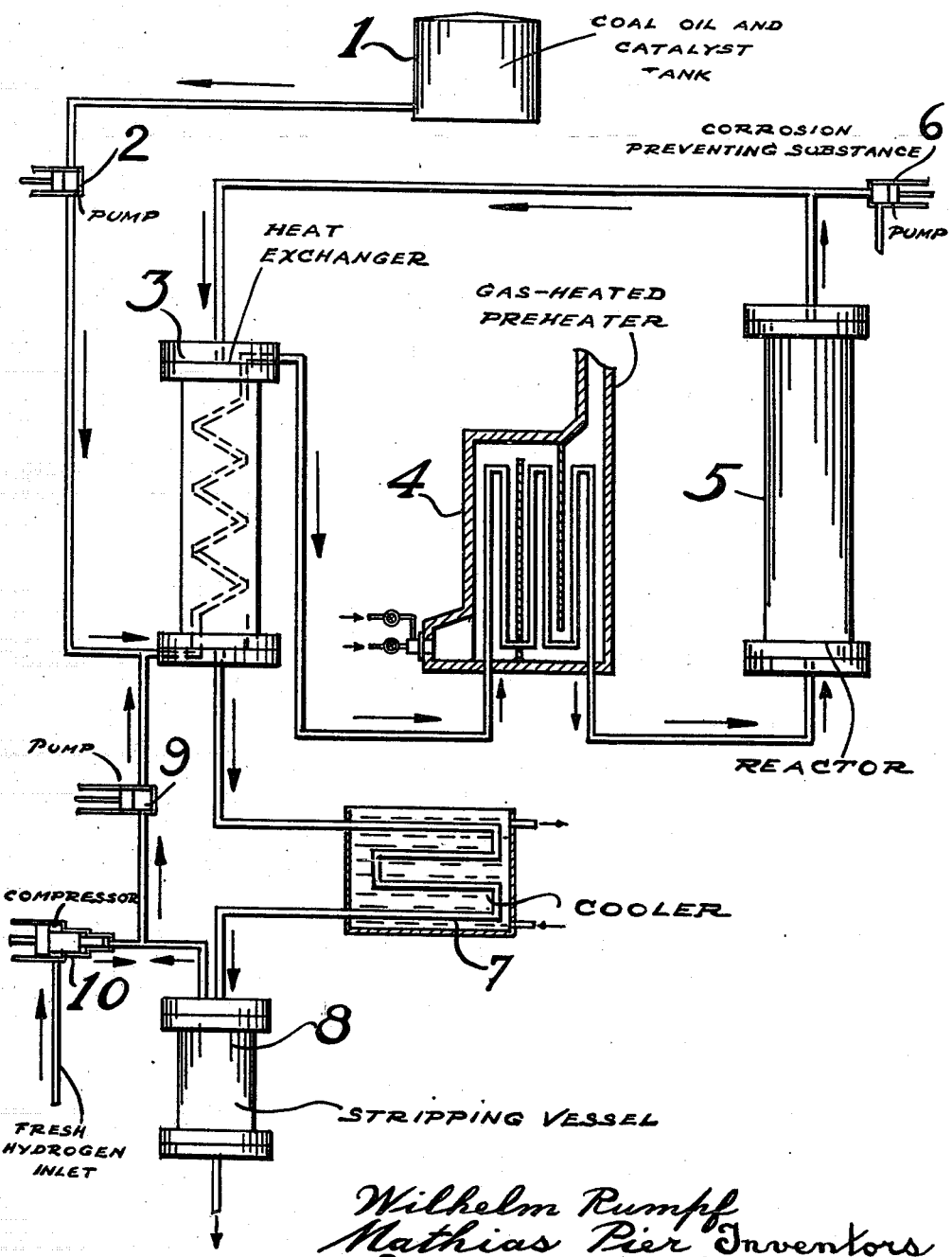

THERMAL TREATMENT OF CARBONACEOUS SUBSTANCES

Mathias Pier, Heidelberg, Wilhelm Rumpf, Ludwigshafen-on-the-Rhine, and Ernst Donath, Mannheim, Germany, assignors to I. G. Farbenindustrie Aktiengesellschaft, Frankfort-on-the-Main, Germany Application November 2, 1934, Serial No. 751,250
In Germany November 10, 1933

3 Claims. (Cl. 196—53)

The present invention relates to improvements in the thermal treatment of carbonaceous substances.

In the thermal treatment of distillable carbonaceous materials of the nature of coals, tars, mineral oils and their distillation and conversion products for the purpose of obtaining valuable products, as for example in the treatment with hydrogenating gases, if desired under pressure, such as the destructive hydrogenation or hydrofining, or other treatments such as cracking, materials have frequently to be worked up which have an acid reaction or yield substances having an acid reaction under the working conditions, said materials hereinafter being referred to as comprising acid-reacting substances. This is the case for example when working up mineral coals containing chlorine or solid carbonaceous materials which have been impregnated, for example for the purpose of neutralizing the ash constituents, with acids, such as hydrochloric acid, sulphuric acid or nitric acid, or with substances which split off acids during the working up, as for example organic chlorine compounds, or when working up tars, mineral oils or their distillation, cracking or destructive hydrogenation products to which acids, acid salts, acid-reacting gases or vapors or substances which under the working conditions yield acid-reacting substances are added before entry into the apparatus or during the reaction.

Similarly the catalysts, when such are employed, or the carrier substances contained therein may have an acid reaction or may yield substances having an acid reaction during the working up.

It has been found that in such cases corrosion readily takes place on the inner walls of the apparatus if the inner surface of these walls consists of the usual constructional metallic materials such as noble steels, which corrosion injures the apparatus and may even lead to serious trouble in operation.

The simplest method of overcoming the said difficulties by the addition of lime, soda and similar cheap basic substances for the purpose of neutralizing the acids occurring during the reaction cannot be employed because alkaline-reacting alkali metal or alkaline earth metal compounds would then be present during the reaction and would considerably impair the course of the reaction and, for example in the case of previously neutralized coals, would obviate the favorable effects of the said neutralization on the course of the reaction.

We have now found that the said disadvantages can be avoided by carrying out the said thermal treatment, especially with hydrogen under pressure and advantageously in the presence of catalysts promoting said treatment, in the presence of substances which render the acid-reacting substances, in particular chlorine and hydrochloric acid, innocuous to the inner walls of the apparatus without leading to the formation of alkaline-reacting alkali metal or alkaline earth metal compounds, corrosion of the said inner walls thus being prevented to a large extent. As substances which are suitable for the said purpose may be mentioned for example arsenic compounds, as for example arsenious acid, arsenic acid, organic arsenic compounds or arsenic sulphide, or cyanides of the heavy or earth metals. Organic nitrogenous bases, such as aniline, pyridine and quinoline, may also be employed. The action of the said substances may possibly reside in the fact that they render the material of the apparatus passive to the action of the corrosive influences. The additional substances are usually employed in amounts up to 2 per cent, as for example from 0.01 to 2 per cent, or more calculated with reference to the materials to be treated or worked up. The substances for rendering the material of the apparatus passive, which may be termed "passivating" substances, may also be employed for treating the material of the apparatus before the reaction; for example the interior of the apparatus may be provided with a coating of metallic arsenic. An addition of passivating substances during the reaction is then not necessary in all cases although it may frequently be preferable.

It has also been found that the attack on the material of the apparatus is greater the greater the water content of the carbonaceous materials or the greater the amount of water formed during the reaction. The corrosion is the greatest at places at which water condenses or at which for example ammonium chloride or other salts capable of dissociating or salts tending to form ansolvo acids are deposited. It is therefore preferable to add the passivating or corrosion-preventing substances at those places in the apparatus at which the formation of water takes place or at which the water vapor commences to condense. Thus it has proved to be advantageous to add the passivating substances in the neighbourhood of the outlet of the reaction products from the reaction vessel or in the pipes leading to condensers or heat-exchangers or in the cooling devices themselves. The said substances may also be continuously or periodically introduced at different places in the reaction vessel and/or in the latter part of the preheater.

The thermal treatment is usually effected at temperatures of from 200° to 700° C., especially at from 380° to 550° C., advantageously in the presence of hydrogen in which case the treatment is preferably carried out under a superatmospheric pressure, such as a pressure of 50, 100, 200 or more atmospheres and with an addition of catalysts promoting said treatment with hydrogen, such as metal compounds, as for example oxides, sulphides, halides or phosphates of metals of the 2nd to the 8th groups of the periodic system, especially of the 5th and 6th groups, or of metal halides or halogen or hydrogen halides. Also in treatments carried out without added hydrogen, as for example cracking, superatmospheric pressures may be employed. These treatments are also preferably effected in the presence of catalysts, as for example catalysts having a splitting action.

We have also found that the treatment of carbonaceous materials with hydrogenating gases is successfully carried out in technical as well as in economical respects and that the corrosions of the inner walls of the reaction vessels and other devices of the apparatus liable to take place by the action of hydrogen and hydrogen sulphide as well as that of acid substances and in particular of halogens present from the start or by addition as free elements or as volatile halogen compounds in, or evolved on heating as volatile halogen compounds from, the treated carbonaceous materials are avoided, if silver or alloys thereof are employed as protecting material for the apparatus. It is preferable to employ as silver alloys those containing more than 70 per cent and more particularly more than 85 per cent of silver.

In treating initial materials which contain chlorine and which yield volatile chlorine compounds on heating, such as for example, some kinds of bituminous coal, and/or when applying for the improvement of the course of the reaction volatile halogen compounds, in particular chlorine compounds, free halogens, for example, chlorine, or substances, in particular chlorine containing compounds, which split off under the working conditions volatile compounds, such as hydrogen halides, for example hydrogen chloride, as examples of which may be mentioned, carbon tetrachloride, ammonium chloride and the like, most of the materials otherwise known as stable to corrosion in destructive hydrogenation, such as for example, noble steels, do not withstand the action of the halogens or hydrogen halides, in particular of hydrogen chloride or other halogen compounds to a sufficient degree. We have found that if the apparatus or those parts thereof liable to be corroded under the said circumstances are internally coated with or provided with a lining of silver or alloys thereof no dangerous corrosion arising from said causes will occur.

According to the circumstances it may be of advantage to have the reaction vessel or vessels, or the inlet or the outlet pipes or other equipment, such as preheaters, heat-exchanger coolers, separators, distillation towers and the like or several of these coated with the said material.

Since the corrosion is particularly strong in that part of the apparatus, the surfaces of which assume a temperature of between 200° and 350° C., in which the products issuing from the reaction vessel are cooled, or where the condensation thereof begins and where the halogens or their compounds are absorbed by the liquid or condensed products and in the condensed water originally contained in the initial material or formed during the reaction, it is of advantage to coat or line only the preheater and/or the heat exchanger and/or the cooling vessel and/or the tube connections between this vessel and the reaction vessel with silver or alloys thereof. In some cases it may be of advantage to specially protect, in accordance with the present invention only those parts, which attain temperatures of between 200° and 350° C., more particularly between 230° and 300° C.

The coatings may be produced by galvanic plating or by pyro-technical silvering and the like. The vessel or tubes may, however, also be protected by a lining consisting of silver or an alloy thereof. As metals, which have proved to be advantageous for alloying with silver for the purposes of the present invention may, for example, be employed copper, manganese, aluminium, cadmium, magnesium, antimony, tin, zinc, or alloys of these metals.

The coatings may also be prepared by filling up the single devices by casting with silver or alloys of silver and then boring these devices in such a manner that the silver or alloy thereof still remains as a thin coating. It has also proved to be of advantage to first coat the devices with zinc and then to apply thereon a coating of silver for example by dipping the devices into molten silver.

The said coatings or linings will usually not be very thick and in most cases a thickness of less than 1 millimeter, for example between 0.1 and 0.8 millimeter will suffice. If desirable thicker coatings or linings may of course also be applied.

The expression "hydrogenation reactions" is intended to comprise the most various reactions, in so far as halogen, hydrogen halides or other halogen compounds are present. Thus the expression includes the treatment of destructive hydrogenation with hydrogenating gases of carbonaceous materials, such as coal of all varieties, including lignite, other solid carbonaceous materials such as peat, shales and wood, mineral oils, tars and distillation, conversion and extraction products thereof. The said treatment may be used to produce hydrocarbons of all sorts, such as motor fuels and in particular anti-knock motor fuels, middle oils, kerosene and lubricating oils. The said expression also includes the removal of non-hydrocarbon impurities, such as sulphur- or oxygen-containing substances or nitrogen compounds by the action of hydrogen or gases containing or supplying hydrogen from crude carbonaceous materials, for example the refining by treatment with hydrogen of crude benzol, of crude motor fuels or of lubricating oils. The said expression further includes the conversion of oxygen- or sulphur-containing organic compounds to produce the corresponding hydrocarbons or hydrogenated hydrocarbons, for example the conversion of phenols or cresols into the corresponding cyclic hydrocarbons or hydrogenation products thereof. Finally it includes the hydrogenation of unsaturated compounds and more particularly of unsaturated hydrocarbons or of aromatic compounds and more particularly of aromatic hydrocarbons, for example, to produce hydroaromatic hydrocarbons.

The said reactions with hydrogen or hydrogen-containing gases are usually carried out at temperatures between 250° and 700° C. and as a rule between about 380° and 550° C. The pressures employed are usually in excess of 20 atmospheres and as a rule preferably in excess of 50 atmospheres. In some reactions, however, for example in the refining of crude benzol rather low pressures, for example, of the order of 40 atmospheres may be employed. In some cases atmospheric pressure is employed. Generally, however, pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 400, 600, 1000, 2000 cubic meters or more of hydrogen, measured under normal conditions of temperature and pressure, per ton of carbonaceous material treated may be used. The smallest amount of hydrogen will be about 75 cubic meters per ton and amounts of hydrogen of 3000, 4000, 5000, 7000 cubic meters of hydrogen or more are frequently employed.

It is particularly advantageous to operate by continuously introducing fresh carbonaceous material into the reaction vessel and to continuously remove products therefrom. If desired several reaction vessels may be employed in which different conditions of temperature and/or pressure may, if necessary, be maintained and in which different catalysts may also be employed. Sufficiently converted reaction products may be removed behind any of the reaction vessels. Materials which have not been sufficiently reacted on may be recycled or treated in a further reaction vessel.

The carbonaceous materials may be treated in the reaction in the liquid, solid or gaseous phase as required.

The reaction is advantageously carried out with streaming hydrogenating gases.

The gases for use in the reaction may consist of hydrogen alone or of mixtures containing hydrogen, for example, a mixture of hydrogen with nitrogen, or water gas, or of hydrogen mixed with carbon dioxide, sulphuretted hydrogen, water vapor or methane or other hydrocarbons.

The hydrogenation reaction may be carried out in the presence of any suitable catalysts. Catalysts containing the heavy metals of the sixth group of the periodic system, especially molybdenum and tungsten, but also chromium and uranium or compounds thereof, or tin, lead, vanadium, rhenium, manganese, zinc, cadmium, aluminium or cobalt or the compounds thereof, may be employed with particular advantage. Particularly good results are obtained with the oxides, hydroxides or sulphides of the metals of the sixth group of the periodic system.

The accompanying drawing shows in a diagrammatic manner a front elevation, partly in section, of an arrangement in which the process according to the present invention may be carried out with advantage.

In this drawing number 1 denotes a tank from which a paste of coal in oil containing a suitable catalyst is withdrawn and passed by way of pump 2 into the heat exchanger 3 from which it is conveyed into the gas heated preheater 4. The preheated paste issuing from this preheater is introduced into the reaction vessel 5 in which it undergoes conversion. Directly behind the outlet of the converted products from this reaction vessel a corrosion preventing substance which is supplied by way of pump 6 is introduced into the pipe connecting the reaction vessel with the heat exchanger 3 into which the converted products are passed. After leaving the heat exchanger the products are conveyed into cooler 7 and thence into separator 8, from the bottom of which the liquid constituents are withdrawn while the gases are withdrawn at the top and recycled, if desired after having passed through a washing tower (not shown), by means of pump 9 to the system. Fresh hydrogen is introduced from compressor 10.

The following examples will further illustrate the nature of this invention but the invention is not restricted to these examples. The percentages are by weight unless otherwise stated.

*Example 1*

In the catalytic destructive hydrogenation of a mineral coal which contains 0.28 per cent of chlorine in such a form that it forms volatile acid compounds under the reaction conditions, the parts of the apparatus exposed to a temperature within the range of from 200° to 300° C., are so strongly corroded by the effluent products consisting of oil, water, hydrogen chloride, hydrogen sulphide, ammonia and hydrogen, that a considerable decrease in the thickness of the walls of the apparatus takes place. If 0.1 per cent of arsenic pentasulphide be dispersed in oil and added to the products before their entry into the heat-exchanger, however, the corrosion in the same period of time is reduced to about one tenth.

*Example 2*

In the catalytic destructive hydrogenation under pressure of bituminous coal, to which carbon tetrachloride is added in such an amount, that 0.75 per cent of chlorine are present in the total amount of coal, the parts of the apparatus which come into contact with the formed reaction products and gases at a temperature in the range of 200° to 320° C. are provided with a coating consisting of silver. Even after a long time of operation no corrosion of the apparatus occurs, whereas when applying prime highly alloyed steel corrosion takes place after a short time.

What we claim is:—

1. In the thermal treatment of distillable carbonaceous materials in the presence of acid-reacting substances capable of corroding the metallic surfaces of the inner walls of the apparatus in which the said treatment is effected, the step of adding to the said materials at a place in the neighbourhood of the outlet of the reaction product from the reaction vessel or in the devices following the reaction vessel, a substance selected from the group consisting of arsenic compounds, cyanides of the heavy and earth metals and organic nitrogenous bases.

2. In the destructive hydrogenation of distillable carbonaceous materials in the presence of acid-reacting substances capable of corroding the metallic surfaces of the inner walls of the apparatus in which the said destructive hydrogenation is effected, the step of adding to the said materials after their issue from the destructive hydrogenation vessel a substance selected from the group consisting of arsenic compounds, cyanides of the heavy and earth metals and organic nitrogenous bases.

3. In the process as claimed in claim 1 adding to the treated materials a compound selected from the group consisting of arsenious acid, arsenic acid, organic arsenic compounds and arsenic sulphide.

MATHIAS PIER.
WILHELM RUMPF.
ERNST DONATH.